United States Patent
Klausberger et al.

(10) Patent No.: US 7,480,441 B2
(45) Date of Patent: Jan. 20, 2009

(54) METHOD FOR SEAMLESS REAL-TIME SPLITTING AND CONCATENATING OF A DATA STREAM

(75) Inventors: Wolfgang Klausberger, Hannover (DE); Meinolf Blawat, Hannover (DE); Stefan Kubsch, Hohnhorst (DE); Hui Li, Hannover (DE); Dietmar Hepper, Hannover (DE)

(73) Assignee: Thomson Licensing, Boulogne-Billancourt (FR)

( * ) Notice: Subject to any disclaimer, the term of this patent is extended or adjusted under 35 U.S.C. 154(b) by 882 days.

(21) Appl. No.: 10/920,609

(22) Filed: Aug. 18, 2004

(65) Prior Publication Data
US 2005/0076390 A1   Apr. 7, 2005

(30) Foreign Application Priority Data
Aug. 21, 2003   (EP) .................................. 03018986

(51) Int. Cl.
*H04N 5/92* (2006.01)

(52) U.S. Cl. ............................. 386/46; 710/8; 711/114

(58) Field of Classification Search .................. 386/46; 710/8; 713/1, 2; 711/114, 132, 170
See application file for complete search history.

(56) References Cited

U.S. PATENT DOCUMENTS 6,134,596 A    10/2000  Bolosky et al.
6,233,637 B1 *  5/2001  Smyers et al. ............... 710/311
6,272,088 B1    8/2001  Aramaki et al.
6,993,646 B2 *  1/2006  Smyers .......................... 713/2
2002/0188769 A1 * 12/2002 Swidler et al. ................. 710/8

FOREIGN PATENT DOCUMENTS

EP    0695062      1/1996
EP    0917376      5/1999
EP    0942416 A    9/1999
EP    1211688      6/2002

OTHER PUBLICATIONS

Search Report.

* cited by examiner

*Primary Examiner*—David E Harvey
(74) *Attorney, Agent, or Firm*—Joseph J. Laks; Paul P. Kiel; Guy H. Eriksen

(57) ABSTRACT

When recording packetized real-time streaming data, e.g. multimedia data, it is in general not possible to know in advance the size of the data stream, and thus the required storage area. Therefore the storage device may be full before the data stream is completely stored. The disclosed method for storing and retrieving the remaining part of the data stream on another storage device uses metadata tags (10,11) and data buffers (IB1,IB2) to split a data stream seamlessly into chunks while recording it, and distribute the chunks in real-time to different connected storage devices (D1,D2), so that the chunks can be seamlessly concatenated again in real-time for replaying the stream. The metadata tags (10,11) contain identifiers for the successive storage node (N2) and/or the preceding storage node (N1) and for the last stored application packet.

11 Claims, 4 Drawing Sheets

METHOD FOR SEAMLESS REAL-TIME SPLITTING AND CONCATENATING OF A DATA STREAM

This application claims the benefit, under 35 U.S.C. § 119 of European Patent Application 03018986.4, filed Aug. 21, 2003.

FIELD OF THE INVENTION

This invention relates to a method for distributed storage and retrieval of data streams. In particular it relates to seamless real-time splitting and concatenating of data streams, e.g. multimedia data streams.

BACKGROUND

Multimedia home networks are often used to process data streams containing audio, video and other data. This includes recording and replaying large amounts of data. Usually a data stream that contains a unit, like a video film or an audio track, is handled as a single file, and stored as such. Internally, these streams are often structured into packets, like e.g. defined for Digital Video (DV), or in the MPEG-2 standard. Depending on the standard, these packets may have different lengths, e.g. 188 bytes for MPEG-2.

While data amounts as well as available storage capacity increase drastically, organizing the storage area is an annoying task for the user. Various automation approaches exist, like e.g. storage-area networks that are used to separate storage devices from other devices, thus offering storage capacity to all connected data generating or data consuming devices. Such techniques are called distributed storage, since they may automatically distribute a file that shall be stored to any of the connected storage devices, and find and retrieve it later. In such systems the user usually does not need to know in detail where certain content is stored. To be able to handle various types of application packets, distributed storage systems for multimedia networks often put the application packets into packet containers for storage, like e.g. defined for the DVD Stream Recording standard "DVD Specifications for Rewritable/Re-recordable Discs, Part 5, Stream Recording, May 2000". To enable proper real-time playback, timestamps (ATS) are assigned to the application packets.

Distributed storage methods may also be applied for home networks, which tend to become convenient automatic storekeepers for various kinds of data. The system may look without any user intervention autonomously for a storage device that may provide enough storage capacity for recording. For the application, e.g. video recording, this behavior of the storage system is usually transparent.

However, when real-time streaming data shall be recorded, it is in general not possible to know in advance the size of the data stream, and thus the required storage area. Therefore storage area management is difficult, so that recording of real-time data is usually terminated when the selected storage device is full.

The architecture of distributed storage systems, like networks in general, can be based on either client-server or peer-to-peer (P2P) principles. P2P networks require no central network organization, since the nodes, or peers, usually communicate directly with each other. Services and resources, e.g. storage area, may be shared, thus offering numerous enhanced functions to the user.

SUMMARY OF THE INVENTION

A distributed storage system for multimedia home networks should be able to support real-time recording of streaming data. Since due to the nature of real-time recording the length of a recorded file, or data stream, is not known at recording time, there is the risk of the selected storage device being full before the data stream is completely stored. In that case the remaining part of the data stream may be stored on another storage device. Anyway, selecting and activating the other storage device takes time, which hampers real-time behavior.

The problem to be solved by the invention is to split a data stream seamlessly into chunks while recording it, and distribute the chunks in real-time to different connected storage devices, so that the chunks can be seamlessly concatenated again in real-time for replaying the stream.

A method to solve this problem is disclosed in claim 1. An apparatus that utilizes the method for storing is disclosed in claim 9. A method for retrieving the portions of a data stream from different storage media is disclosed in claim 2. An apparatus that utilizes the method for data retrieval is disclosed in claim 10.

According to the invention, metadata tags and temporary buffers are used to enable seamless real-time splitting and concatenating of data in a distributed storage environment. When the maximum capacity of a storage device is reached while a data stream is being recorded on it, the inventive method makes it possible to split the stream and store the remainder on another storage device. The storage capacity that is available on the recording storage node and on the other storage nodes of a network may be monitored for this purpose.

While a data stream is recorded on a first storage device, and the available storage capacity on this device comes to a limit, another storage device in the network is selected that is suitable for continuing the recording later on, after the currently active storage device is full. When the remaining free storage area of the first device is below a threshold, the other storage device gets a notification and starts buffering the streaming data in a temporary buffer, in parallel to the first storage device. When the first storage device is full, i.e. it may store no more packets, it sends to the second device a notification containing an identifier that defines the last packet stored by the first device. Upon reception of this notification, the second device identifies the first packet that it has to store, and transfers this start packet and the successive data packets from its temporary buffer to its storage area. Thus it can continue recording the data stream.

Advantageously the method prevents data loss, and thus prevents noticeable interruption at playback of the stream.

The process of selecting another storage device to continue the recording may be based on any parameters, like e.g. free storage capacity, possible recording speed or type of content.

Similarly, for replaying the complete data stream the different chunks are concatenated. The first chunk, containing the beginning of the stream, is marked as such by a metadata tag. This mark may be explicit or implicit by specifying no predecessor. The metadata tag also contains an identifier, e.g. a timestamp value or UUID, of the last application packet contained in the related data chunk. It may also contain an identifier of the storage device that holds the next chunk, and an identifier of the next or the previous chunk or both, e.g. PlaycellUUID. While the first chunk is read from the storage device and buffered for replaying, its metadata tag is evaluated and a message is sent at least to the next storage device, identifying the last packet of the first chunk, and identifying the next chunk. After the second storage device detected that it has the required chunk, e.g. with the PlaycellUUID, it monitors the data packets replayed by the first device on the common data connection, and when it detects the last packet, it starts replaying the packets of the second chunk. Depending on the length of the single data chunks, the second device may receive the message early enough to read the first packets of its data chunk in advance and buffer them in a temporary buffer, so that replaying can start without delay created by data retrieval from the second storage medium. Alternatively, the message sent to the second device may contain the identifier of the currently replayed chunk, e.g. its PlaycellUUID, and the metadata tag of the second chunk stored on the second device contains the identifier of its preceding chunk. When the identifiers are equal, the second chunk is the next chunk to be replayed, after the last packet of the first chunk, detected by its ATS.

Thus, a real-time data stream may be broken into data chunks that may be stored on different devices, and that can be concatenated seamlessly for playback. To handle such concatenated streams in a distributed storage system, the inventive method comprises describing the complete sequence of data chunks by metadata descriptors that are generated automatically by the decentralized distributed system and then associated with the data chunks as navigation data, thus generating a linked list of data chunks. According to the invention, the metadata descriptors contain for each chunk at least all the information that is required for reconstruction of the original stream, e.g. for replaying the data. The metadata descriptors contain at least the following information: an identifier for the data stream to which the data chunk belongs, an identifier for the preceding data chunk if one exists, an identifier for the successive data chunk if one exists, and an identifier for the last packet. Further, it may appear useful to store the following information in the metadata descriptors: identifier for the storage device that is expected to hold the preceding/successive chunk, date and time of recording, title of data stream, and timestamps of the first and/or the last packet, e.g. ATS. These metadata descriptors may contain hierarchy, e.g. when the chunk related metadata descriptors refer to another, stream related metadata descriptor.

Advantageous embodiments of the invention are disclosed in the dependent claims, the following description and the figures.

BRIEF DESCRIPTION OF THE DRAWINGS

Exemplary embodiments of the invention are described with reference to the accompanying drawings, which show in FIG. 1 distributed stream objects being linked by metadata descriptors.

DETAILED DESCRIPTION OF THE INVENTION

Figure 1:
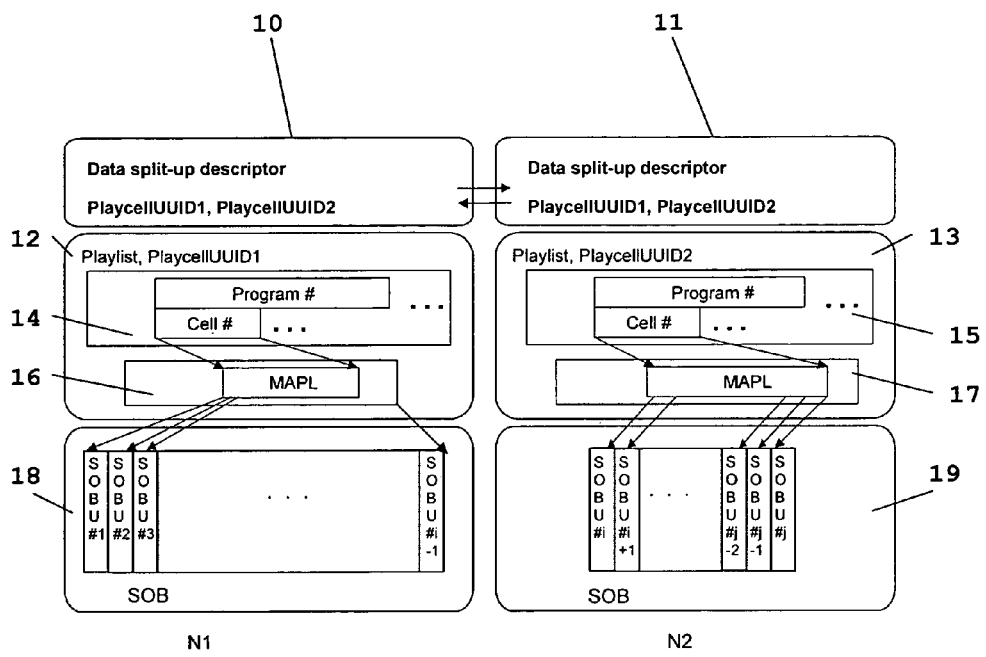

The following description of exemplary embodiments of the inventive method is based on the DVD Stream Recording standard, but the method can as well be used for data according to any other standard for stream recording. FIG. 1 shows an exemplary embodiment of the invention, being a distributed storage system that stores distributed stream objects linked by metadata descriptors. In this case, two nodes N1,N2 are involved in the storage of a data stream that is composed of multiple units SOBU#1, . . . , SOBU#j, and that is split into two data chunks 18,19. The DVD Stream Recording standard defines Stream Objects (SOB) consisting of Stream Object Units (SOBU) of 64 kB length, each as a container for variable length application packets. In FIG. 1, a first storage device N1 records a stream 18 containing SOBUs SOBU#1, . . . , SOBU#i-1, as long as it has storage area available. While recording, it also generates and stores an information file 12 referring to the stream object 18 and containing the playlists and playcells labeled with unique labels PlaycellUUID1, PlaycellUUID2, and other navigation information 14, e.g. for the program. The information file 12 also contains a Mapping List (MAPL) 16 for navigation purposes. In the MAPL, the arrival time intervals for each SOBU are captured. It is used to convert these times into the address of the corresponding SOBU, which contains the application packet with the specified packet arrival time. Playlists contain start and end time of one or more playcells. Further, a metadata descriptor 10 is generated and attached to the information file 12 or the stream object 18 respectively. Initially, the metadata descriptor 10 contains the playcell label PlaycellUUID1.

While the first storage device N1 is recording, other connected storage devices may be monitored for available storage capacity. Alternatively, e.g. a broadcast message may be sent to all connected storage devices, requesting storage area. One of these storage devices N2 is selected as potential successor of the currently active device N1. Then, if the storage capacity limit of the first storage device N1 is reached while the stream continues, the other storage device N2 is activated to continue recording of the stream. This device N2 gets a notification about the ATS of the last application packet that was stored in the first storage device N1, being contained in the last stored unit SOBU#i-1. The second storage device N2 continues storage of the stream in another stream object 19, being composed of the units SOBU#i, . . . , SOBU#j following the last unit SOBU#i-1 stored by the first device N1, wherein this stream object 19 contains the subsequent application packets. The second storage device generates for this stream object 19 an information file 13 containing a MAPL 17 and identifiers 15, and a metadata descriptor 11. The metadata descriptor 11 contains not only the playcell labels PlaycellUUID1, PlaycellUUID2 but also a pointer to the metadata descriptor 10 of the other storage device N1 storing the preceding data chunk, i.e. stream object 18. Likewise, the metadata descriptor 10 in the first storage device N1 is updated such that it contains a pointer to the second storage device N2.

In one embodiment of the invention the metadata descriptors 10,11 may also contain detailed information about where the preceding and/or successive SOB is stored, e.g. address, file name or path name.

Figure 2:
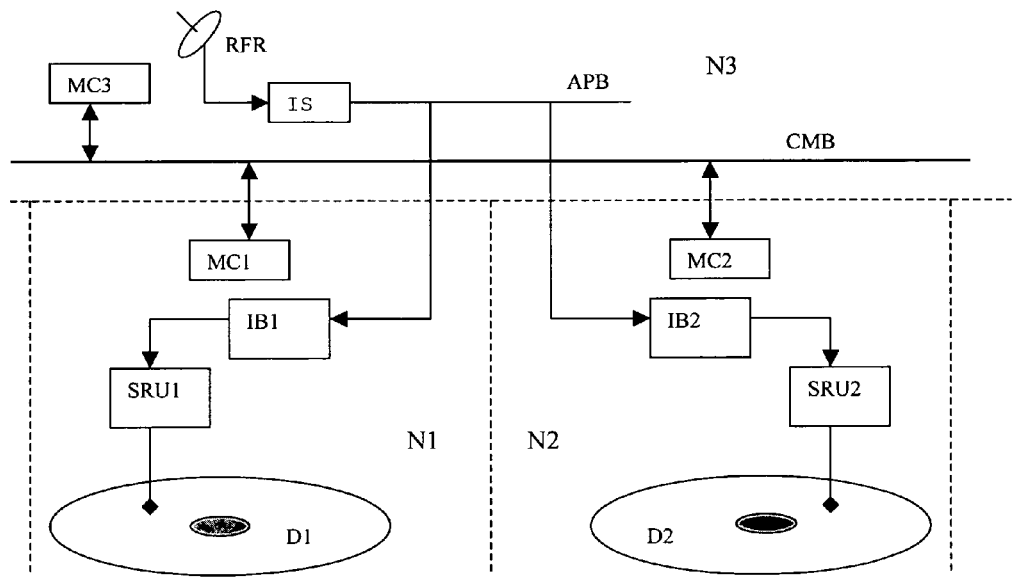
FIG. 2 a distributed storage system model in the case of recording.

One requirement for the distributed storage system is the automatic self-organizing of file splitting when the storage capacity limit of a node is reached. In P2P networks, a selfcontrolled exchange of messages between the nodes is used for this task. FIG. 2 depicts a simplified distributed storage system model with two storage nodes N1,N2 and a separate node N3 for the input service IS, in the case of recording. Exemplarily, the nodes are assumed to be peers in a P2P network, so that the bus connections between nodes mentioned in the following are virtual connections, using the same physical connection. Data are received e.g. via a radio frequency receiver RFR. An input service IS, e.g. a decoder, in the receiver node N3 extracts the application packets, captures timestamps and distributes the packets on an application packet bus APB to the storage nodes N1,N2. The storage nodes N1,N2 are equipped with interfaces to the application packet bus APB, input buffers IB1,IB2 and stream recording units SRU1,SRU2 that generate navigation information of the streaming data, and pack the application packets into streaming packets according to the utilized stream recording standard, e.g. SOBUs for the DVD Stream Recording standard. The stream recording units SRU1,SRU2 in each storage node may access storage media D1,D2, e.g. optical discs or harddisks, where they may store the streaming packets. The nodes N1 . . . N3 have message controllers MC1 . . . MC3 that are connected to a common control message bus CMB, so that the nodes can exchange control messages and thus organize recording and file splitting if necessary.

According to the DVD Stream Recording standard, time information has to be added to every application packet to enable proper real-time playback of stored transport packets. This capturing of application timestamps (ATS) can be performed e.g. by the input service IS that receives and decodes a transport stream from the receiver RFR. The input buffers IB1,IB2 of the storage nodes N1,N2 are used to bridge the timeframe for switching from one node to another when file splitting becomes necessary. Though not depicted in FIG. 2, it may also be advantageous to use any transparent network protocol for the application packet bus APB, adding error correction data or the like.

Further, control messages between the two storage nodes N1,N2 are exchanged, containing the identifiers, or UUIDs, of the generated playcells. Those UUIDs are used to describe the splitting of the stream, and are written into the metadata descriptor of the stream object at the related nodes. The metadata descriptor is in this example stored on the same medium as the stream object. If the DVD Stream Recording standard mentioned above is used, the Application Private Data Field can be used as container for the metadata descriptors.

Figure 3:
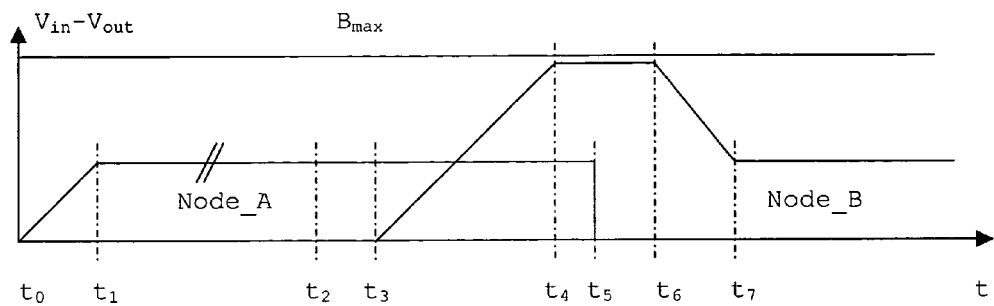
FIG. 3 a messaging and buffering scenario when seamlessly switching from a storage device to another while recording.

A buffer scenario shown in FIG. 3 explains the switching from one node to another in the case of recording a stream. In this exemplary scenario the buffering of a data stream in an input buffer has been initially started at a first node Node_A, at a time $t_0$. The input buffer filling $V_{in}$-$V_{Out}$ increases until at time $t_1$ the recording of buffered data on a mass storage medium starts. Emptying the buffer and recording the buffered data is usually faster than receiving and buffering new data, so that the buffer filling will oscillate around an average value, but for this simplified figure it is assumed that the buffer filling remains constant. The storage node Node_A monitors its own remaining free storage capacity. When it notices at time $t_2$ that its capacity will be reached soon, the node Node_A sends a message with a "call for free capacity" to some or all other connected nodes. A second node Node_B is chosen as a successor. In P2P networks this may be done in a negotiation process. In other cases another unit, e.g. a main server, may select a successor node. When the second node Node_B is selected and notified at time $t_3$, it starts to buffer the input stream in its input buffer, as a stand-by node in parallel to the active storage node Node_A. Since the buffered data in the stand-by node Node_B are not yet being recorded, the buffer filling increases. When the buffer is almost full at time $t_4$, before a "full" message from the active node Node_A is received, the oldest buffered data may be overwritten, like e.g. in a ring buffer. During this time the buffer filling is constant since the buffer remains full, or almost full.

When the first node Node_A has no free storage capacity left, it stops recording and sends a "full" message to the stand-by node Node_B at time $t_5$. This message includes the application timestamp (ATS) value of the last recorded application packet. After some time, at the time $t_6$, the stand-by node Node_B has received this message and finished its storage configuration. From now on it is considered the active node. It evaluates the ATS included in the message and starts recording buffered application packets that have a higher ATS than the ATS contained in the message. Other application packets are dropped.

The recording process includes reading the application packets from the input buffer, packing them in streaming packets according to the employed streaming standard and writing the streaming packets to the storage medium, e.g. disk. Thus, the buffer filling decreases until at a time $t_7$ it has reached an average level, as described above. This level may e.g. be programmed or hardware-defined. The size of the input buffer $B_{max}$ has to be sufficient for bridging the time between the first node Node_A sending the "full" message at $t_5$ and the second node Node_B beginning the recording at $t_6$. This time includes also the mentioned messaging and the preparation and configuration of the recording process at the second node Node_B. The buffer must be able to hold all application packets received during this timeframe.

Figure 4:
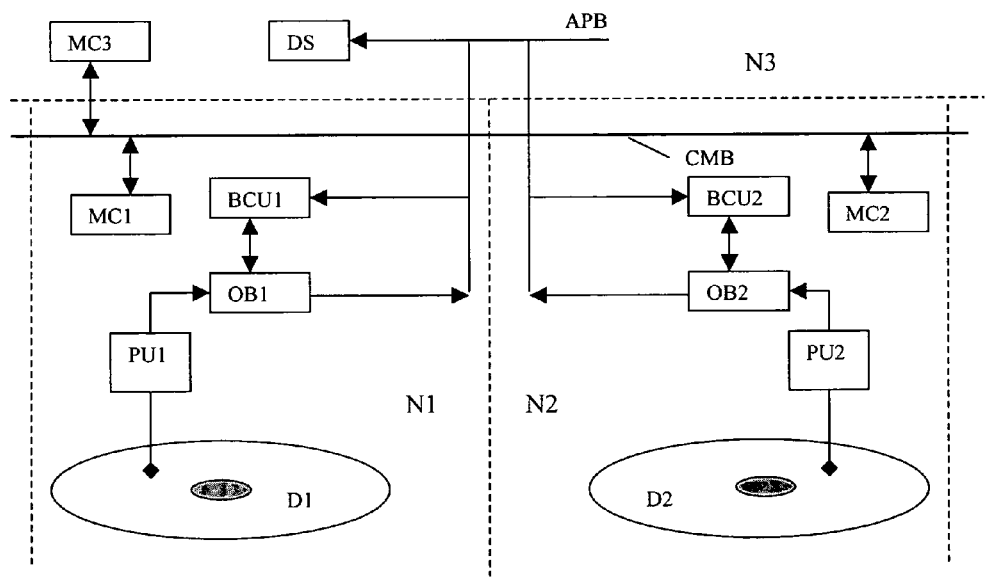
FIG. 4 a distributed storage system model in the case of playback.

For continuous playback of the streaming data stored in a distributed storage system, output buffers are necessary to bridge the time slot when switching between nodes. FIG. 4 demonstrates a simplified distributed storage system model in the playback case, with two storage nodes N1,N2 and one node N3 for the display service DS, e.g. a monitor. The storage nodes N1,N2 are equipped with interfaces for the application packet bus APB, output buffers OB1,OB2, buffer control units BCU1,BCU2 and playback units PU1,PU2 being connected to storage media D1,D2. The playback units PU1,PU2 convert the streaming packets that are read from the storage media D1,D2 back to application packets. Furthermore, all nodes contain message controllers MC1 . . . MC3 that may exchange control messages on a control message bus CMB. The output buffers OB1,OB2 have two functions: first to continuously provide application packet data while switching between nodes, and second to match the data rate supplied by the playback units PU1,PU2 with the required application packet data rate. If e.g. data read from a storage medium D1 on a first node N1 are played back, then a metadata tag associated with the respective playlist may indicate that the stream is not completely stored on this medium D1, but a successive chunk of the same stream is stored on another node N2. The metadata tag also includes the ATS of the last stored application packet, and an identifier of the other playcell. It may also include more detailed information about where the data are stored.

While the first node N1 plays back its data chunk on a common connection, e.g. application packet bus APB, the message controller MC1 sends a message to the other nodes message controller MC2, requesting preparation for playback of the respective successive data stream. Upon reception of this message, the other node N2 may start reading the data from its storage medium D2 and buffer the application packets in its output buffer OB2 until the message controller MC2 receives an "empty" message from the active node N1. When the active playback unit PU1 has written its last application packet to its output buffer OB1, the active node N1 sends an "empty" message to the other node N2. Upon reception of this message, the other node N2 becomes the active node. Then the second node N2 monitors the ATSs of the application packets on the bus APB, using its buffer control unit BCU2. When the last packet is detected, the buffer control unit BCU2 enables the output buffer OB2 to output its contents on the bus APB, and also enables the playback unit PU2 to read more data from the storage medium D2 into the output buffer OB2.

Figure 5:
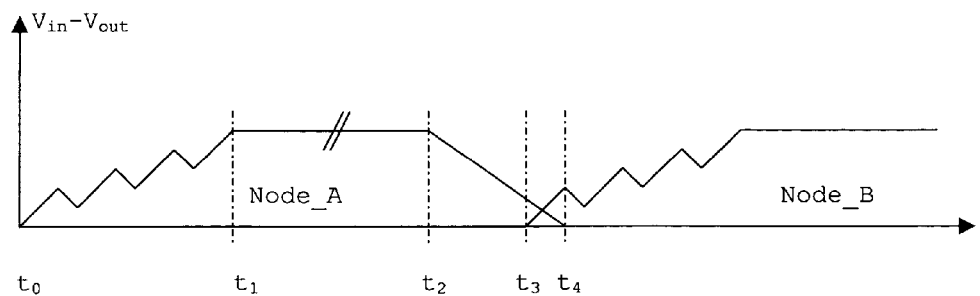
FIG. 5 a messaging and buffering scenario when seamlessly switching from a storage device to another during playback.

A buffer scenario shown in FIG. 5 explains for distributed stream recording the switching from one node to another, in case of playback operation.

The playback of a stream has been initially started at a first node Node_A at time $t_0$. Depending on the used buffer filling strategy, a fast disc reading process can lead to a bursty data behavior, indicated as variable buffer filling, before the buffer reaches a quasi-stable state at time $t_1$. Due to the mentioned data bursts the buffer filling always varies around this quasi-stable state, as mentioned above. From the metadata descriptor that characterizes the stream splitting, the first node Node_A knows, or may find out by a request, which other node Node_B is the successor node that holds the next part of the streaming data. At time $t_2$ the last packet was read and buffered at the active node Node_A, and it sends a "call for the successor node" message to the other node Node_B, including the timestamp value of the last application packet. The successor node Node_B receives the message, prepares the playback process and starts to buffer application packets at time $t_3$. The filling of its output buffer OB2 increases from now on. To achieve seamless playback when switching between nodes, the successor node Node_B reads from the application packet bus APB the application packets sent by the active node Node_A and evaluates the timestamps. The buffer control unit BCU2 compares these ATSs with the ATS from the "call for successor node" message. When these timestamps are equal, meaning that the output buffer OB1 of the first node Node_A is empty at time $t_4$, the output buffer OB2 starts to transmit its packets to the bus APB after the end of the current packet, so that the display service DS in the display node N3 receives the application packets seamlessly from the two storage nodes N1,N2. The size of the output buffers OB1,OB2 is calculated such that the time for the messaging and the configuration of the playback process in the successor node may be bridged.

In the following, two other embodiments of the invention, being solutions for seamless playback of distributed chunks of a stream, are described.

Figure 6:
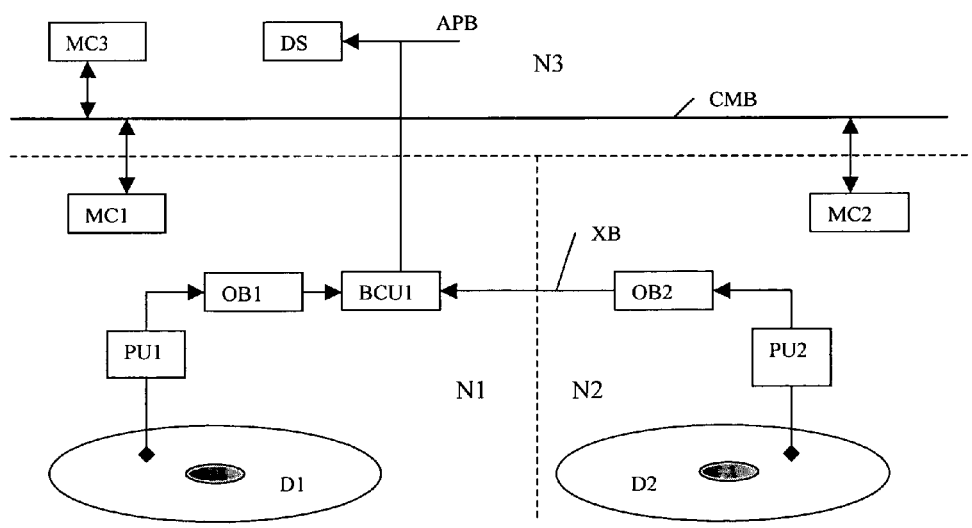
FIG. 6 a distributed storage system model in the case of playback, routing all chunks via one node.

FIG. 6 shows a simplified distributed storage system model for playback with two storage nodes N1,N2 and one node N3 for the display service. Correspondingly this model may also be used for recording. In this model all parts of the stream are routed via one node N1, and only one buffer control unit BCU1 is active. Only this node controls the seamless playback of the stream, while the other node N2 sends its application packets not to the application packet bus APB, but to the active buffer control unit BCU1. As mentioned above, in the case of P2P networks this virtual extension bus XB is the same physical connection.

Figure 7:
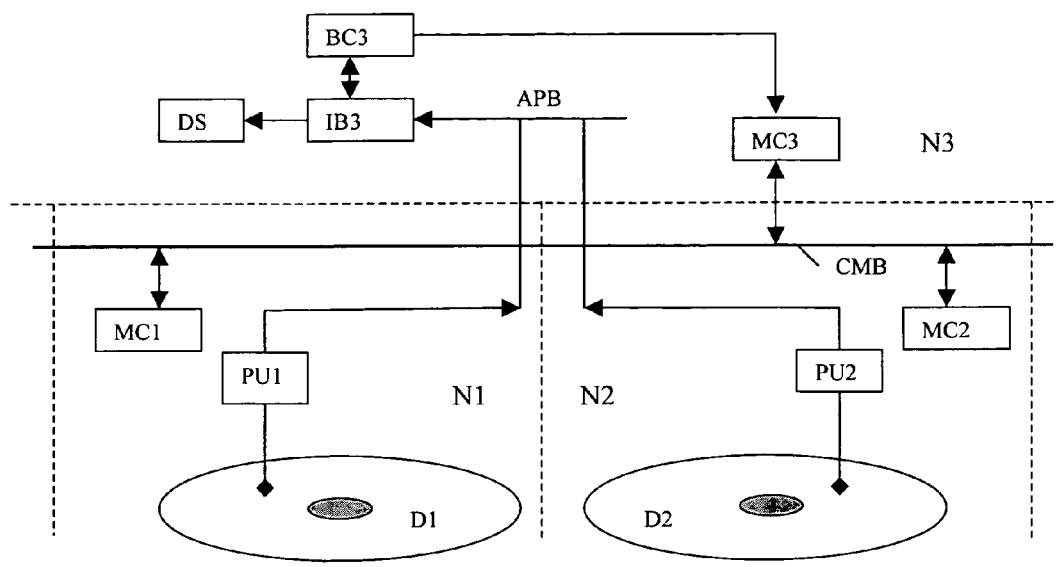
FIG. 7 a distributed storage system model in the case of playback, with an input buffer at a non-storage node.

Similarly, FIG. 7 shows another simplified distributed storage system model for playback with two storage nodes N1,N2 and one node N3 for the display service. In this model the buffering is performed at the display service node N3, which controls the seamless playback of the stream. With this solution it is necessary to buffer data at the non-storage node. A message controller MC3 at the display service node N3 receives a message from the active storage node N1, indicating the ATS of its last application packet. A buffer control unit BCU3 monitors the timestamps of the buffered application packets, and when reception of the last packet from the active storage node N1 was detected, a message is sent to the message controller MC2 of the successor node N2, which in turn begins to retrieve application packets from its storage medium D2 and send it to the input buffer IB3 of the display service node N3. The input buffer IB3 must be able to hold enough application packets to bridge the required messaging and data retrieval time.

The inventive method may also be used in systems where a monotonous series of numbers, e.g. sequence numbers, are used instead of time stamps for the identification of application data packets. In this case the numbers must be long enough to prevent misinterpretation after wrap-around, e.g. 32 bit like for TCP/IP packets.

In one embodiment of the invention the different storage devices are located within the same device, e.g. multiple hard-disks or other magnetic discs within one multimedia recorder.

In one embodiment of the invention the recording may be done such that the second storage device gets no message about when to start buffering data. Instead it buffers the input data continuously. In this case it is sufficient to receive a message that identifies the first buffered application packet to be stored.

In one embodiment of the invention the metadata descriptor contains an identifier for the storage device that is expected to hold the preceding and/or successive chunk.

In one embodiment of the invention the metadata descriptor may also contain detailed information about where the preceding and/or successive chunk is stored, e.g. address, file name or path name.

In one embodiment of the invention the data stream may be split not only when the first storage medium is full, but also due to other reasons, e.g. recording problems in the first storage device.

The inventive method is suitable for storing and retrieving any data stream that is composed of identifiable units, like packets with identifiers, on a plurality of storage devices. Further, the data retrieval may serve any purpose, e.g. copying, encoding, transmitting or replaying.

The invention claimed is:

1. A method for storing an incoming data stream, the data stream being composed of identifiable data units, comprising the steps of in a first storage device storing a first portion of the data stream on a first storage medium, and creating and storing a first data set associated to the first portion of the data stream, the data set containing an identifier for the first portion of the data stream;

sending a request from the first storage device to one or more other storage devices;

receiving in the first storage device one or more answers from the one or more other storage devices;

selecting a second storage device from the one or more other storage devices from which an answer was received;

storing in the selected second storage device the incoming data stream on the second storage medium;

sending from the first storage device to the second storage device an identifier for the last data unit stored on the first storage medium, and storing the identifier together with the first data set in the first storage device;

detecting in the second storage medium in the second storage device the identified data unit within said stored data stream;

storing on a third storage medium in the second storage device a second portion of the data stream containing subsequent data units, and creating and storing a second data set associated to the second portion of the data stream, the data set containing an identifier for the second portion of the data stream; and storing at least one of the identifiers together with the other data set in the other storage device.

2. Method according to claim 1, wherein the step of selecting a second storage device from the one or more other storage devices is based on free storage capacity, possible recording speed or type of content to be stored.

3. A method for retrieving successive portions of a contiguous data stream from a plurality of storage devices, the data stream being composed of identifiable data units like packets, comprising the steps of retrieving a first portion of the data stream from a first storage device, and transmitting it on an output bus;

retrieving in the first storage device a data set associated with the first portion of the data stream, the data set containing a first and a second identifier, the first identifier being suitable for identifying a second portion of the data stream, and the second identifier being an identifier for the last data unit contained in said first portion of the data stream;

sending the first and second identifiers from the first storage device to the other of said plurality of storage devices;

detecting in a second storage device that the second portion of the data stream identified by the received first identifier is available for retrieval from a storage medium;

retrieving in the second storage device at least the beginning of said second portion of the data stream from a storage medium and storing it on another storage medium;

detecting in the second storage device when said last data unit stored on the first storage medium is transmitted on the output connection, reading the beginning of the second portion of the data stream from said other storage medium and transmitting it on the output connection.

4. Method according to claim 1, wherein the data set associated with the first portion of the data stream further contains an identifier for a second storage device.

5. Method according to claim 1, wherein the storage media comprise memories and optical or magnetic disks.

6. Method according to claim 1, wherein the storage devices are nodes in a network.

7. Method according to claim 1, wherein the identifiable data units contain a monotonous series of numerical values or timestamps.

8. Method according to claim 1, wherein information about the storage location of the second portion of the data stream is stored in the first storage device or information about the storage location of the first portion of the data stream is stored in the second storage device.

9. An apparatus for storing a data stream, the apparatus being a node in a decentralized network, the data stream being composed of identifiable data units, comprising a first storage medium being a memory for buffering a part of the received data stream;

means for transferring data read from the first storage medium to the a second storage medium;

means for receiving from another node in said decentralized network a request for storage, answering the request and receiving an identifier for a specific data unit, the means being also capable of sending a request, receiving a plurality of answers from different devices and based on the evaluation of said answers selecting one of the answering devices;

means for detecting if the specified data unit is stored in the first storage medium;

means for initiating, upon detection of the specified data unit, the transfer of data units subsequent to said specified data unit from the first to the second storage medium; and means for creating and storing a data set associated to the data stream, the data set containing an identifier for the data stream and identifier for the last data unit stored on the second storage medium.

10. An apparatus for retrieving a portion of a data stream, wherein the apparatus is a node in a decentralized network, and wherein the data stream is composed of identifiable data units, comprising means for reading data from a first storage medium;

a second storage medium being a memory;

means for transferring data read from the first storage medium to the second storage medium, wherein the means initially fills the second storage medium with the beginning of the data stream read from the first storage medium;

means for receiving an identifier for a specific data unit;

means for receiving data from a data connection;

means for detecting if the specific data unit is received on the data connection and, upon said detection, initiating the transfer of data units from the second to the first storage medium.

11. Apparatus according to claim 9, wherein the decentralized network is a peer-to-peer network, and the nodes are peers.

* * * * *